US012240648B2

(12) United States Patent
Degliesposti et al.

(10) Patent No.: US 12,240,648 B2
(45) Date of Patent: Mar. 4, 2025

(54) FEEDING UNIT FOR A MANUFACTURING MACHINE AND RELATED FEEDING METHOD

(71) Applicant: G.D SOCIETA' PER AZIONI, Bologna (IT)

(72) Inventors: Paolo Degliesposti, Bologna (IT); Fabio Gaudenzi, Bologna (IT); Luca Lanzarini, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 57 days.

(21) Appl. No.: 17/797,989

(22) PCT Filed: Feb. 5, 2021

(86) PCT No.: PCT/IB2021/050956
§ 371 (c)(1),
(2) Date: Aug. 5, 2022

(87) PCT Pub. No.: WO2021/156815
PCT Pub. Date: Aug. 12, 2021

(65) Prior Publication Data
US 2023/0022086 A1    Jan. 26, 2023

(30) Foreign Application Priority Data
Feb. 6, 2020   (IT) .................. 102020000002314

(51) Int. Cl.
*B65B 7/16*     (2006.01)
*B65B 7/28*     (2006.01)
(Continued)

(52) U.S. Cl.
CPC .............. *B65B 7/161* (2013.01); *B65B 7/168* (2013.01); *B65B 7/2807* (2013.01); *B65B 65/02* (2013.01); *B65G 47/902* (2013.01); *B65G 47/914* (2013.01)

(58) Field of Classification Search
CPC .... B65G 47/914; B65G 47/902; B65B 7/168; B65B 7/161
(Continued)

(56) References Cited

U.S. PATENT DOCUMENTS 4,403,907 A    9/1983   Koller et al.
4,730,503 A    3/1988   Rosenthal
(Continued)

FOREIGN PATENT DOCUMENTS

CH    495517 A    8/1970
CH    586583 A5   4/1977
(Continued)

OTHER PUBLICATIONS

International Search Report and Written Opinion for Corresponding International Application No. PCT/IB2021/050956, mailing date May 21, 2021.
European Notice of Opposition for European Application No. 21710044.50-1014/4100327, issued date Feb. 20, 2024.
European Patent Application No. 21710044.5, Letter From the Opponent, dated Nov. 14, 2024.

*Primary Examiner* — Praachi M Pathak
(74) *Attorney, Agent, or Firm* — MARSHALL, GERSTEIN & BORUN LLP

(57) ABSTRACT

A feeding unit which is configured to feed articles from a pick-up station to a delivery station. The feeding unit comprises: a gripping head provided with at least one gripping means and attached to a shaft. The shaft is configured to translate along the rotation axis between a lowered position, in which the articles are picked up and released by the gripping head, and a raised position, in which the gripping head rotates between the pick-up station and the
(Continued)

delivery station. The feeding unit comprises two actuators which are coaxial to the shaft and which are configured to respectively translate the shaft between the lowered position and the raised position along the rotation axis and to rotate the shaft around the rotation axis between the pick-up station and the delivery station.

18 Claims, 5 Drawing Sheets

(51) Int. Cl.
   *B65B 65/02* (2006.01)
   *B65G 47/90* (2006.01)
   *B65G 47/91* (2006.01)
(58) Field of Classification Search
   USPC .......................................................... 53/477
   See application file for complete search history.

(56) References Cited

U.S. PATENT DOCUMENTS

| | | | | |
|---|---|---|---|---|
| 10,676,288 | B2* | 6/2020 | Luo | ...................... B65G 47/902 |
| 10,843,349 | B2* | 11/2020 | Suzuki | ................ F16H 25/2204 |
| 2016/0229051 | A1 | 8/2016 | Edelmann | |

FOREIGN PATENT DOCUMENTS

| | | |
|---|---|---|
| DE | 2626655 A1 | 12/1977 |
| DE | 3938353 A1 | 5/1990 |
| DE | 202005019060 U1 | 3/2006 |
| DE | 102008001282 A1 | 10/2009 |
| DE | 102015214824 A1 | 2/2017 |
| WO | WO-2016166141 A1 | 10/2016 |

* cited by examiner

FEEDING UNIT FOR A MANUFACTURING MACHINE AND RELATED FEEDING METHOD

CROSS-REFERENCE TO RELATED APPLICATIONS

This patent application is a U.S. national phase of International Patent Application No. PCT/IB2021/050956 filed Feb. 5, 2021, which claims the benefit of priority from Italian patent application no 102020000002314 filed on Feb. 6, 2020, the respective disclosures of which are each incorporated herein by reference in their entireties.

TECHNICAL FIELD

The present invention relates to a feeding unit and to a relative feeding method. The present invention is advantageously applied to a manufacturing machine of bottles (such as, in particular, small bottles, flasks or, more generally, containers) for products of the pharmaceutical industry, to which the following disclosure will explicitly refer without thereby losing generality.

PRIOR ART

It is known that a manufacturing machine of bottles for products of the pharmaceutical industry, for example pharmaceuticals, comprises a conveying system (typically consisting of several conveyors arranged in series one after the other) which advances a succession of bottles through: a weighing station for weighing the empty bottles; a filling station in which a predetermined amount of liquid or powdery product is fed into each bottle; a weighing station for weighing the full bottles; a capping station in which each bottle is provided with a respective cap; possibly a sealing (ring sealing) station in which each bottle is provided with a plastic or metal coating surrounding the cap; and finally a labeling station, in which at least one more or less customized label is applied to each bottle.

Manufacturing machines thus typically comprise at least one feeding unit, for example in the capping machine (i.e., the machine that applies the caps on the bottle), in the ring sealing machine (i.e., the machine that applies the retaining rings on the cap) or any assembling machine that moves an article from a pick-up station to a release station. The feeding units of known type are known to comprise a gripping head which rotates around a shaft, a robotic arm or so-called pick-up and release systems (also known as pick and place), i.e. which pick up the articles from a pick-up station (typically a store) and feed them to a delivery station. However, the robotic arms and the pick-up and release systems have to have, in order to ensure their operability, a large space dedicated to them and are very expensive. The feeding units having a rotating gripping head are known to have actuators provided with a reducer, i.e. so-called motor reducers, for each degree of freedom. The latter however create clearances in the transmission of the motion and therefore the final positioning of the articles is not very accurate. Furthermore, also in this case, the motor reducers have large dimensions. In summary, the known feeding units are spatially very bulky and expensive.

From document US2016229051, instead, a robotic device of a laboratory automation system for handling test tubes is known. The robotic device comprises a robotic arm comprising two portions hinged together and is provided at its terminal end with a gripping means, i.e. grasping, for holding the test tubes and for moving them between a pick-up station and a delivery station. The robotic device comprises a shaft on which the robotic arm is mounted for rotating between the pick-up station and the delivery station and for translating between a lowered position and a raised position. The robotic device is provided with two actuators, each configured to cause a respective portion of the robotic arm to rotate and a further actuator for translating (i.e., lowering or raising) the robotic arm. All actuators are arranged sideways and spaced with respect to the shaft axis. In other words, the actuators are arranged eccentrically with respect to the shaft axis. The robotic device described in US2016229051 requires a large number of actuators and has very large spatial dimensions.

DESCRIPTION OF THE INVENTION

The object of the present invention is to provide a feeding unit and a relative feeding method which are easy and cost-effective to produce.

In accordance with the present invention, a feeding unit is provided, according to what claimed in the appended claims.

In accordance with the present invention, a feeding method is also provided, according to what claimed in the appended claims.

The claims describe embodiments of the present invention forming integral part of the present description.

BRIEF DESCRIPTION OF THE DRAWINGS

The present invention will now be described with reference to the accompanying drawings, which illustrate a non-limiting example thereof, wherein.

PREFERRED EMBODIMENTS OF THE INVENTION

Figure 1:
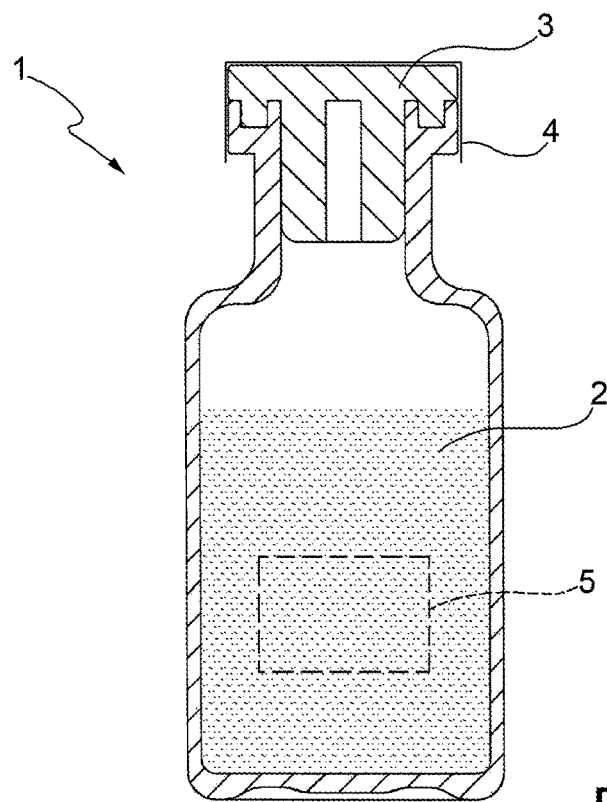
FIG. 1 is a schematic view of a bottle for products of the pharmaceutical industry.

In FIG. 1, reference numeral 1 indicates, as a whole, a bottle (i.e., a small bottle, a flask or more generally a container) for example disposable (i.e., throwaway which is thus used only once and is then thrown away) of a known type for containing a product 2 of the pharmaceutical industry (typically liquid or powdery). The bottle 1 is closed by means of a cap 3 which is coated with a plastic coating 4 which has to be removed in order to be able to take the cap 3 off or a metal coating (known as "retaining ring") which at least partially surrounds the cap 3, which is not removed, and which allows taking out the product 2, for example by means of a syringe. Furthermore, the bottle 1 is provided with (at least) one label 5 (illustrated with a broken line) which is glued on an outer surface of the bottle 1.

Figure 2:
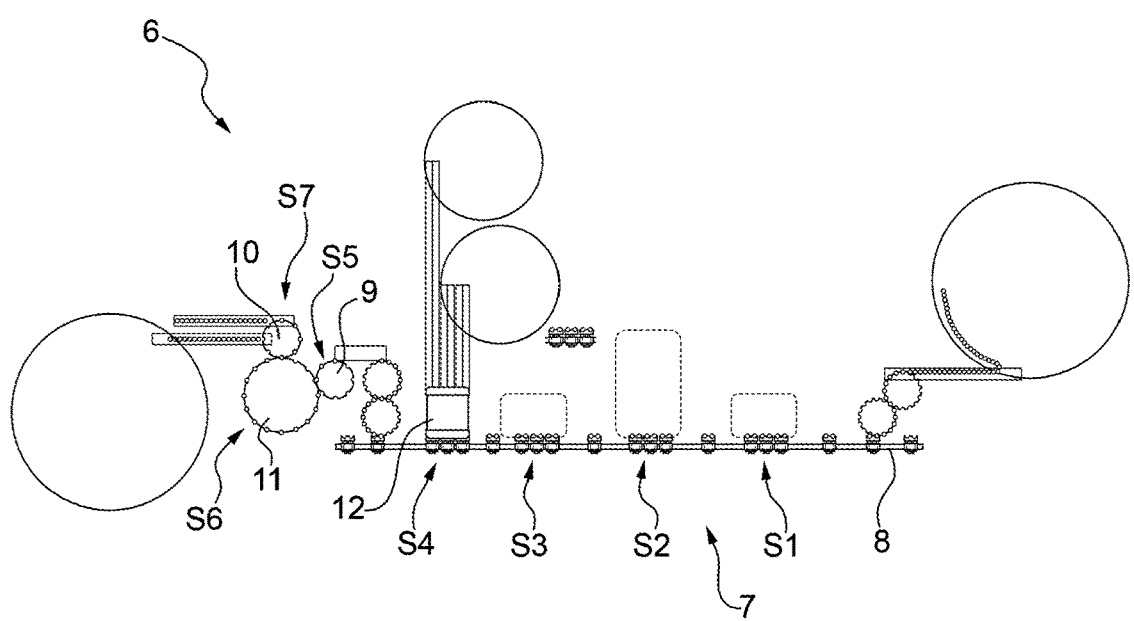
FIG. 2 is a schematic plan view of a manufacturing machine for filling bottles such as the one illustrated in FIG. 1.

In FIG. 2, reference numeral 6 indicates, as a whole, an example of a manufacturing machine 6, i.e. a filling machine, for filling bottles 1 such as the one illustrated in FIG. 1. The manufacturing machine 6 comprises a conveying system 7 which advances a succession of bottles 1 along a processing path and through a plurality of processing stations. In particular, the conveying system 7 comprises a linear conveyor 8 and a plurality of conveying drums 9, 10 and 11 having vertical axis arranged in succession. Along the linear conveyor 8 a weighing station S1 for weighing the empty bottles 1, a filling station S2 in which a predetermined quantity of liquid product 2 is fed into each bottle 1, a weighing station S3 for weighing the full bottles 1 and a capping station S4 in which each bottle 1 is provided with a respective cap 3 are arranged, respectively. Whereas, at the conveying drums 9, 10 and 11, arranged downstream of the linear conveyor 8, a labelling station S5 in which at least one more or less customized label 5 is applied to each bottle 1, a sealing (or ring sealing) station S6 in which each bottle 1 is provided with a plastic coating 4 (illustrated in FIG. 1) or a metal retaining ring (not illustrated) is applied, which at least partially surrounds the cap 3, and finally a waste station S7 in which the defective bottles 1 are eliminated are arranged.

Figure 3:
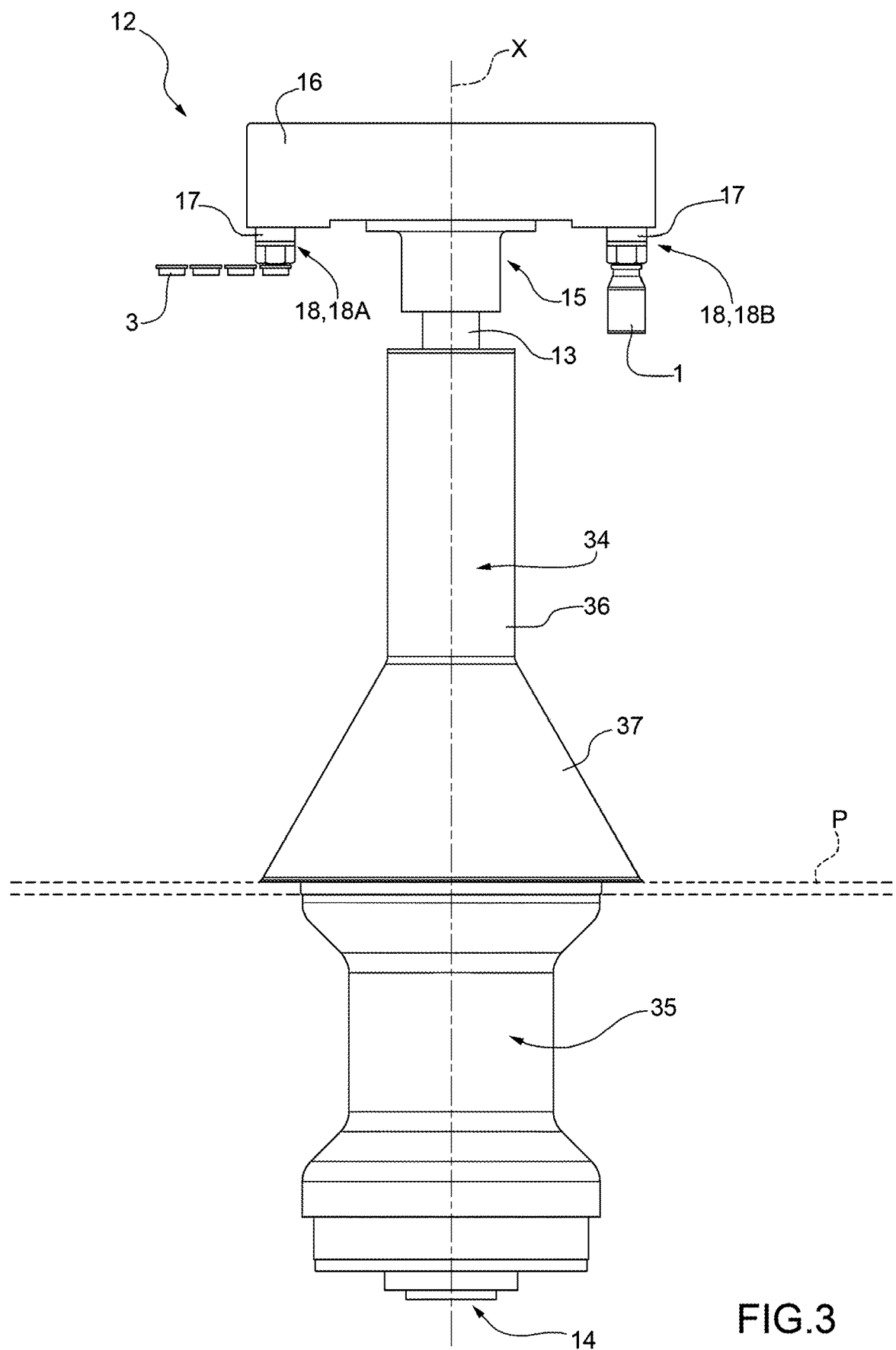
FIG. 3 is a schematic front view of a feeding unit of FIG. 2, wherein a gripping head is positioned in a lowered position.
Figure 4:
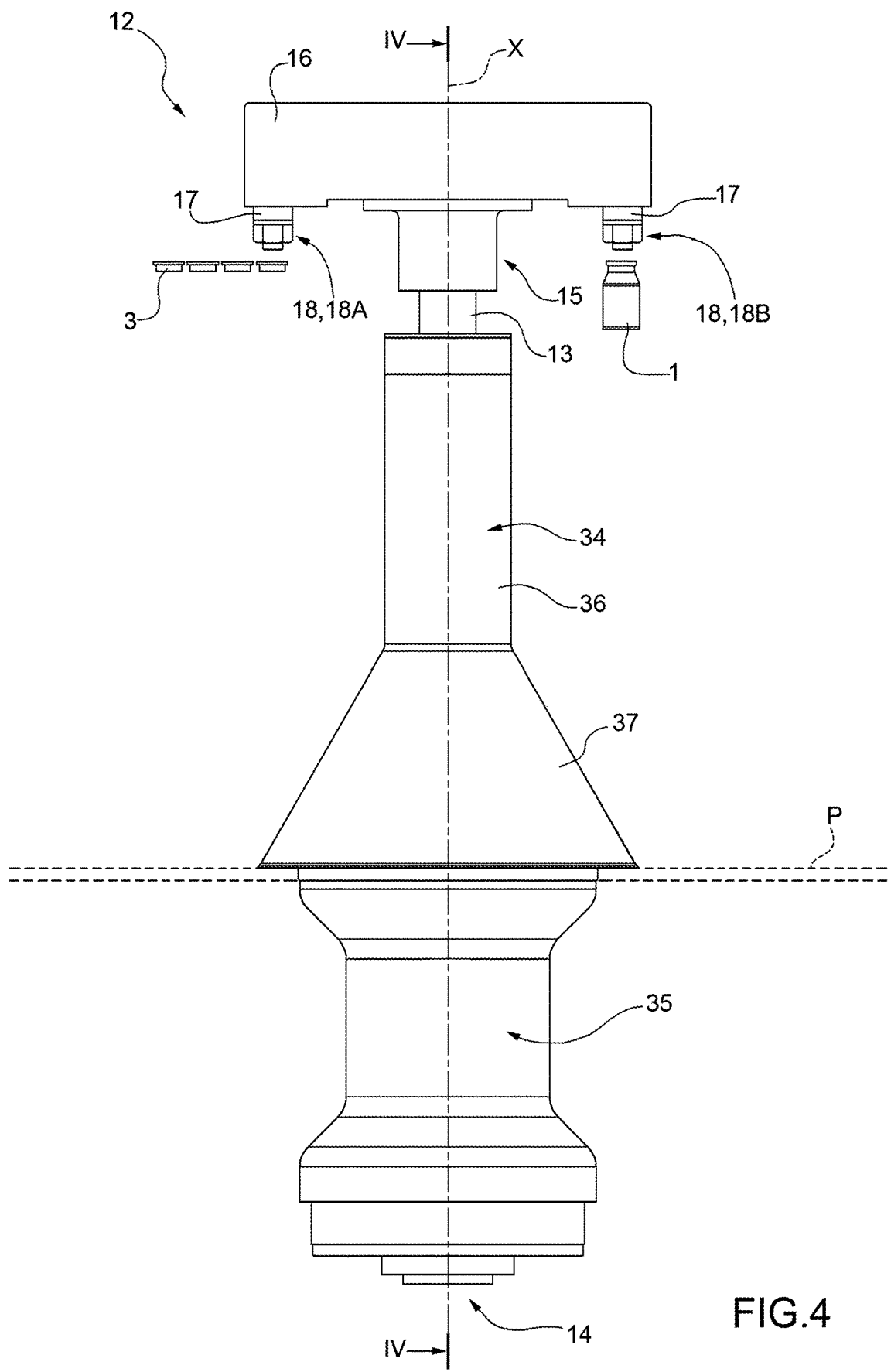
FIG. 4 is a schematic front view of the feeding unit of FIG. 2, wherein the gripping head is positioned in a raised position.
Figure 5:
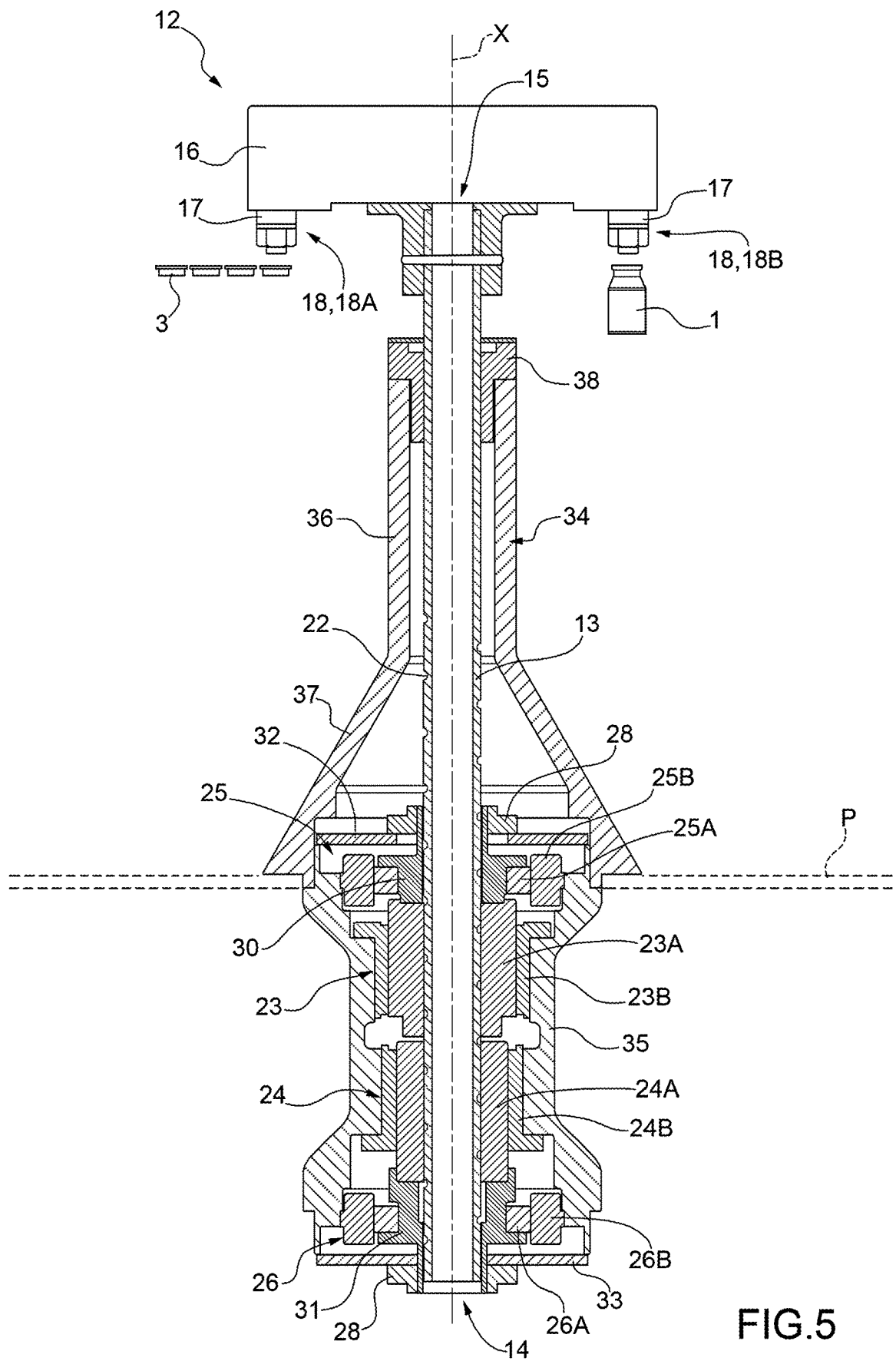
FIG. 5 is a schematic sectional view along the line IV-IV of the feeding unit illustrated in FIG. 4.

The manufacturing machine 6, in particular for bottles of pharmaceutical products 2, comprises at least one feeding unit 12 which is illustrated in detail in FIGS. 3-5. The feeding unit 12 feeds articles (in particular the caps 3) from a pick-up station S10 to a delivery station S11. Typically, the feeding unit 12 is arranged, in use, on any support surface P (such as for example a frame) of the manufacturing machine 6 and which has been indicated with a broken line in FIGS. 3-5.

In the following disclosure, explicit reference will be made to the cap 3 as fed article, without thereby losing generality. In fact, as an alternative to the cap 3, any article may be fed without thereby departing from the present invention.

The feeding unit 12 comprises a shaft 13 which is mounted on a rotation axis X in a rotary manner and is provided with a proximal end 14 and a distal end 15, which is opposite the proximal end 14, at which a gripping head 16 is arranged (i.e., mounted) in an integral manner. In other words, the gripping head 16 is rigidly attached to the shaft 13 at the distal end 15 thereto and rotates integrally therewith.

Figure 6:
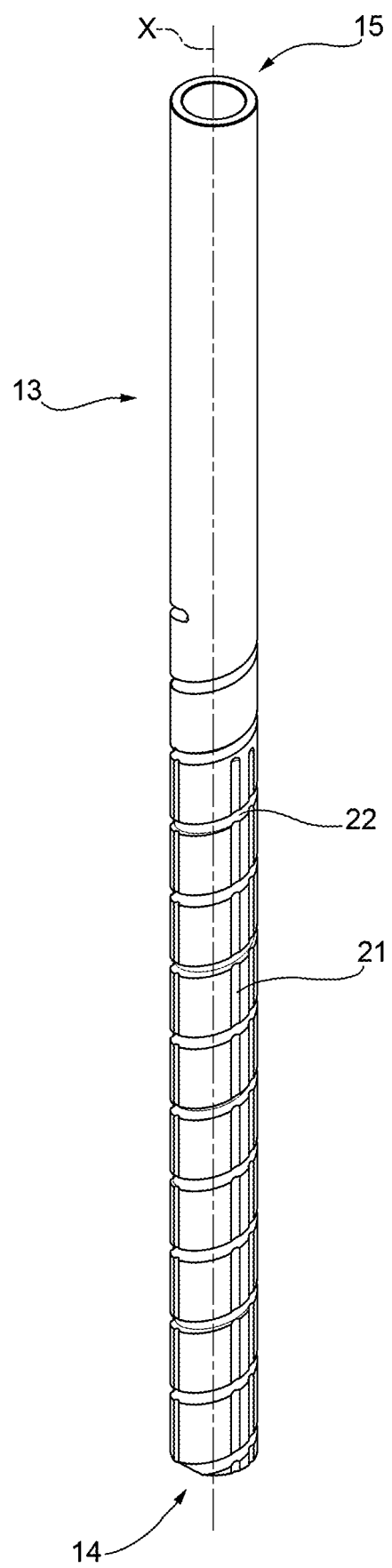
FIG. 6 is a perspective view of a shaft of the feeding unit of FIGS. 3-5.

According to what illustrated in FIGS. 3-6, the rotation axis X of the shaft 13 is vertical, in particular vertical with respect to the support surface P. According to an alternative embodiment, not illustrated, the rotation axis X of the shaft 13 may be horizontal, in particular parallel to the support surface P, or it may be arranged along a direction which is a linear combination between the vertical direction and the horizontal direction. Advantageously, as illustrated in FIGS. 5 and 6, the shaft 13 is hollow in order to be able to house, on the inside, components, such as for example the cables or feeding pipes, in particular electric cables, pneumatic pipes and/or oil-hydraulic pipes. Alternatively, the shaft 13 may be solid, i.e. it is not hollow.

According to the present invention, the gripping head 16 is provided with at least one gripping means 17 which is configured to pick up and hold the cap 3 in the pick-up station S10 (as illustrated in FIG. 3) and subsequently to release each cap 3 in the delivery station S11 (as illustrated in FIGS. 4 and 5).

According to what illustrated in FIGS. 3-5, the gripping head 16 comprises at least two, preferably a plurality of, gripping means 17 which are arranged on different sides of the gripping head 16 so that when one of the gripping means 17 is in the pick-up station S10, the other gripping means 17 is in the delivery station S10, and vice versa. In particular, the gripping means 17 are arranged on two opposite rows 18 respectively (i.e., the row 18A is arranged opposite and parallel to the row 18B), each arranged on opposite sides of the gripping head 16 with respect to the rotation axis X of the shaft 13. Therefore, the gripping head 16 is preferably symmetrical with respect to the rotation axis X of the shaft 13. The gripping means 17 of each row 18A or 18B are arranged equidistant with respect to each other.

Advantageously, the gripping means 17 of the gripping head 16 are suction cups or pliers which are configured to pick up, hold and subsequently release the caps 3. In particular, the gripping means 17 may be of the pneumatic, mechanical or electromechanical type.

As illustrated in detail in FIG. 6, the shaft 13 has a plurality of longitudinal grooves 21 which extend longitudinally between the proximal end 14 and the distal end 15 and a plurality of helical grooves 22 (illustrated also in FIG. 5) which extend between the proximal end 14 and the distal end 15. In other words, the shaft 13 has the longitudinal grooves 21 which are substantially longitudinal slits and which extend longitudinally between the distal end 15 and the proximal end 14 and the helical grooves 22, which are substantially helical slits and which extend helically (i.e., with a helical path) between the distal end 15 and the proximal end 14. The helical grooves 22 define a worm. Whereas, the longitudinal grooves 21 define a grooved profile.

According to a possible embodiment, not illustrated, the helical grooves 22 substantially extend for a length (i.e., a dimension of the shaft 13 measured parallel to the rotation axis X) equal to the total length (i.e. a dimension of the shaft 13 measured parallel to the rotation axis X and comprised between the two ends 14 and 15) of the shaft 13. Analogously, the longitudinal grooves 21 may extend for a length (measured as specified above) equal to the total length (measured as specified above) of the shaft 13.

According to the embodiment illustrated in FIG. 6, the helical grooves 22 extend for a length (measured as specified above) which is less than the total length (measured as specified above) of the shaft 13. According to what illustrated, also the longitudinal grooves 21 extend for a length (measured as specified above) which is less than the total length (measured as specified above) of the shaft 13. In other words, the shaft 13 does not have the longitudinal grooves 21 and the helical grooves 22 at the distal end 15.

In particular, according to what illustrated in FIG. 6, the shaft 13 has the longitudinal grooves 21 and the helical grooves 22 in the same portion of the shaft 13, i.e. the grooves 21 and 22 are superimposed in patches. Alternatively, the shaft 13 has the longitudinal grooves 21 and the helical grooves 22 in two different portions of the shaft 13 and are placed in succession, i.e. the grooves 21 and 22 are not superimposed.

The shaft 13 is movable, i.e. it rotates and/or translates, during the use of the feeding unit 12. In detail, the shaft 13 is configured to translate (i.e., to perform a pure translation or a roto-translation) along the rotation axis X between a lowered position PA (illustrated in FIG. 3) and a raised position PS (illustrated in FIGS. 4 and 5). In other words, the shaft 13 is configured to arrange the gripping head 16 between the lowered position PA and the raised position PS. In the lowered position PA, the caps 3 are picked up and released by the gripping head 16. Whereas, in the raised position PS, the gripping head 16 rotates between the pick-up station S10 and the delivery station S11. In particular, in the raised position PS, the gripping head 16 rotates by a rotation angle α between the pick-up station S10, in which the gripping means 17 pick up respectively a cap 3, and the delivery station S11, in which the gripping means 17 release the respective cap 3.

The rotation angle α is defined as the angle comprised between the angular position of a gripping means 17, when the gripping head 16 is arranged in the pick-up station S10, and the angular position of the same gripping means 17, when the gripping head 16 is arranged in the delivery station S11.

Advantageously, the rotation angle α is less than 360°.

According to the embodiment illustrated in FIGS. 3-5, the gripping head 16 is configured to move cyclically with the rotation angle α equal to 180° from the pick-up station S10 to the delivery station S11 and subsequently, by reversing the direction of rotation, to return to the pick-up station S10 from the delivery station S11. In other words, the gripping head 16 rotates cyclically by 180°, reversing the direction of rotation between one rotation and the following one.

According to an alternative embodiment, the feeding unit 12 comprises a rotatable joint and therefore it is not necessary to reverse the direction of rotation between one rotation and the following one.

The shaft 13 is operated by two sleeves 23 and 24, which are mounted in a rotary manner and are arranged coaxially thereon. In particular, the two sleeves 23 and 24 are arranged coaxially to the shaft 13 and are arranged thereon in succession one behind the other. The sleeves 23 and 24 are hollow, i.e. they have an annular shape, and are mounted in a rotary manner around the rotation axis X. The sleeve 23 is arranged coaxially on the shaft 13 to engage (in particular to exclusively engage) the helical grooves 22 of the shaft 13 so as to move it between the lowered position PA and the raised position PS along the rotation axis X. The sleeve 24 is coaxially arranged on the shaft 13, downstream or upstream of the sleeve 23, so as to engage (in particular to exclusively engage) the longitudinal grooves 21 of the shaft 13 in order to rotate it around the rotation axis X between the pick-up station S10 and the delivery station S11.

According to what illustrated in FIG. 5, the sleeve 23 is arranged downstream of the sleeve 24. Therefore, the sleeve 23 is interposed between the sleeve 24 and the gripping head 16. In other words, the sleeve 24 is arranged upstream of the sleeve 24. Therefore, the sleeve 24 is in proximity to the proximal end 14 of the shaft 13.

According to an alternative embodiment, not illustrated, the sleeve 23 is arranged upstream of the sleeve 24. In other words, the sleeve 24 is interposed between the sleeve 23 and the gripping head 16.

The term upstream thus means the position of an element which is arranged closer to the proximal end 14 with respect to another element. Analogously, the term downstream thus means the position of an element which is arranged closer to the distal end 15 with respect to another element.

Each sleeve 23 or 24 (in particular, at least a portion of the sleeve 23 or 24, preferably the portion 23A or 24A, as will be described in detail in the following) is operated by a respective actuator 25 or 26. The two actuators 25 and 26 may be operated independently. In other words, only one of the two actuators 25 or 26 may be operated or both may be operated simultaneously and independently of each other.

The actuator 25 causes at least the portion of the sleeve 23 to rotate so as to translate the shaft 13 between the lowered position PA and the raised position PS along the rotation axis X. The actuator 26 may be operated independently of the actuator 25 and causes at least the portion of the sleeve 24 to rotate so as to rotate the shaft 13 around the rotation axis X between the pick-up station S10 and the delivery station S11. In detail, in order to rotate the shaft 13 around the rotation axis X between the pick-up station S10 and the delivery station S11, both sleeves 23 and 24 are operated by the respective actuator 25 and 26, as will be described in detail.

Advantageously, the feeding unit 12 comprises a control device (not illustrated) which is configured to control the two actuators 25 and 26 so as to cyclically rotate the gripping head 16, at first, in a direction and, subsequently, in the opposite direction, so as to cause the gripping head 16 to make an oscillatory movement around the rotation axis X preferably having a rotation angle α of 180°, as described above.

Advantageously, the control device which is configured, by controlling the two actuators 25 and 26, to cause the sole sleeve 23 to rotate and to keep the second sleeve 24 still (i.e. not moving) so as to obtain only a translation of the gripping head 16 and to cause the sleeve 23 to rotate and simultaneously to cause the sleeve 24 to rotate so as to obtain only a rotation of the gripping head 16.

Advantageously, the electric actuators 25 and 26 respectively comprise a synchronous electric motor, in particular a brushless electric motor with permanent magnets, preferably an electric torque motor.

According to the invention, the actuators 25 and 26 are mounted coaxially to the rotation axis X and are hollow, i.e. they have an annular shape. Each actuator 25 or 26 is provided with a rotor part 25A or 26A and with a stator part 25B or 26B.

According to what illustrated in FIG. 5, the sleeve 23 comprises an inner annular body 23A and an outer annular body 23B which are substantially concentric. The outer annular body 23B is fixed. Whereas, the inner annular body 23A, which is interposed between the shaft 13 and the outer annular body 23B, is movable and in particular is mounted in a rotary manner (i.e., it rotates) around the rotation axis X. The inner annular body 23A is connected to the actuator 25, in particular to its rotor part 25A, which causes it to rotate. In other words, the actuator 25 causes the inner annular body 23A to rotate.

Analogously, the sleeve 24 comprises an inner annular body 24A and an outer annular body 24B which are substantially concentric. The outer annular body 24B is fixed. Whereas, the inner annular body 24A, which is interposed between the shaft 13 and the outer annular body 24B, is movable and in particular is mounted in a rotary manner (i.e., it rotates) around the rotation axis X. The inner annular body 24A is connected to the actuator 26, in particular to its rotor part 26A, which causes it to rotate. In other words, the actuator 26 causes the inner annular body 24A to rotate.

Advantageously, rolling elements, in particular balls, not illustrated in the figures, are typically interposed between the inner annular body 23A or 24A and the outer annular body 23B or 24B. Analogously, further rolling elements, in particular balls, not illustrated in the figures, are typically interposed between the inner annular body 23A or 24A and the shaft 13. Therefore, the inner annular body 23A or 24A cooperates with the outer annular body 23B or 24B through the aforementioned rolling elements.

The inner annular body 23A engages the helical grooves 22 of the shaft 13 so as to move it between the lowered position PA and the raised position PS along the rotation axis X. In particular, the inner annular body 23A engages the helical grooves 22 through the rolling elements. The inner annular body 24A, instead, engages the longitudinal grooves 21 of the shaft 13 so as to rotate it around the rotation axis X between the pick-up station S10 and the delivery station S11. As will be described in detail in the following, in order to move the shaft 13 between the lowered position PS and the raised position PS, only the sleeve 23 which engages the helical grooves 22 is operated. Whereas, in order to rotate the shaft 13 around the rotation axis X between the pick-up station S10 and the delivery station S11, both sleeves 23 and 24 are operated (i.e. both the sleeve 23 which engages the helical grooves 22 and the sleeve 24 which engages the longitudinal grooves 21). Advantageously, the feeding unit 12 comprises a pair of angle encoders 27 or 28, each being associated with a corresponding actuator 25 or 26 and being configured to acquire the angle position of the corresponding inner annular body 23A or 24A. Each inner annular body 23A, 24A is connected to the respective rotor part 25A, 26A and to the respective angular encoder 27, 28 by means of a respective mounting flange 30, 31. In particular, as illustrated in FIG. 5, the inner annular body 23A, the rotor part 25A of the actuator 25 and the angular encoder 27 are connected to the mounting flange 30, respectively. Preferably, the inner annular body 23A and the rotor part 25A of the actuator 25 are connected to the mounting flange 30 by means of connection means (not illustrated and comprising for example threaded connection means). Whereas, the angular encoder 27 is preferably connected to the mounting flange 30 by means of a shaped connection or by means of a keyed connection.

Analogously, the inner annular body 24A, the rotor part 26A of the actuator 26 and the angular encoder 28 are connected to the mounting flange 31, respectively. In particular, the inner body 23A and the rotor part 26A of the actuator 26 are connected to the mounting flange 31 by means of connection means (not illustrated and comprising for example threaded connection means). Whereas, the angular encoder 28 is preferably connected to the mounting flange 31 by means of a shaped connection or by means of a keyed connection.

As a result, the angular encoder 27 is configured to acquire the angular position (and thus a number n1 of revolutions) of the mounting flange 30, from which the angular velocity of the mounting flange 30 and thus of the inner annular body 23A connected thereto is obtained (preferably by means of the control device). Analogously, the angular encoder 28 acquires the angular position (and thus a number n2 of revolutions) of the mounting flange 31 from which the velocity of the mounting flange 31 and thus of the inner body 24A connected thereto is obtained (preferably by means of the control device).

As illustrated in FIG. 5, the angular encoders 27 and 28 are also supported by a further mounting flange 32 or 33, respectively.

According to a further embodiment not illustrated, the feeding unit 12 additionally comprises a braking device which is independent of the actuators 25 and 26 and is designed to prevent the sleeve 23 and/or 24 and, thus the shaft 13, from moving in the absence of supply of power to the actuator 25 or 26. Alternatively, there may be two different braking devices, each associated with one of the actuators 25 or 26 and/or with one of the two sleeves 23 or 24.

As illustrated in FIGS. 3-5, the feeding unit 12 comprises two guards 34 and 35, which are arranged coaxially around the rotation axis X and in succession to each other. The two guards 34 and 35 radially enclose the feeding unit 12. The guard 34 comprises a cylindrical portion 36 and a truncated cone-shaped portion 37.

According to what illustrated, the proximal end 14 of the truncated cone-shaped portion 37 rests on the support surface P of the manufacturing machine 6. The cylindrical portion 36 is closed at the top by a mounting flange 38 (illustrated in FIG. 5). The mounting flange 38 is configured to radially guide the shaft 13 during its translational and/or rotational movement. In addition, the mounting flange 38 closes the distal end of the guard 34, i.e. the distal end of the cylindrical portion 36 of the guard 34. The proximal portion of the guard 35, instead, is closed by the mounting flange 33. The mounting flange 35 has three substantially cylindrical portions having different diameters.

According to what illustrated, the guard 35 is arranged above the surface P; whereas, the guard 36 is arranged below the surface P.

The feeding method for feeding the caps 3 with the feeding unit 12, which comprises a cycle provided with at least three steps, i.e. an initial step, an intermediate step and a final step, is described in detail in the following.

In the initial picking-up step, the caps 3 are picked up by means of the gripping means 17 on the gripping head 16 at the pick-up station S10. In the intermediate operating step, only the actuator 23 is operated in order to move the shaft 13 along the rotation axis X between the lowered position PA and the raised position PS and/or both sleeves 23 and 24 are operated in order to rotate the shaft 13 around the rotation axis X between the pick-up station S10 and the delivery station S11.

In the intermediate step, the control device controls the two actuators 25, 26 so as to cyclically rotate the gripping head 16, at first, in a direction and, subsequently, in the opposite direction, so as to cause the gripping head 16 to make an oscillatory movement around the rotation axis X preferably having a rotation angle α of 180°, as described above. Advantageously, the control device is configured, by controlling the two actuators 25 and 26, to cause the sole sleeve 23 to rotate and to keep the sleeve 24 still so as to obtain only a translation of the gripping head 16. In particular, the sleeve 24 may be kept still by means of a braking device or by controlling the actuator 26 so as to impart a torque that opposes the movement of the sleeve 24. Alternatively, the control device controls the two actuators 25, 26 so as to cause the sleeve 23 to rotate and simultaneously cause the sleeve 24 to rotate, preferably in the same direction and with the same number of revolutions, so as to obtain only a rotation of the gripping head 16.

In particular, as described above, the intermediate step takes place with a cyclic rotation from 0 to 180° of the shaft 13 and thus of the gripping head 16, reversing the direction of rotation between two successive cycles.

In the final release step, the caps 3 are released by the gripping means 17 from the gripping head 16 at the delivery station S11 and simultaneously the caps 3 are picked up by means of the other gripping means 17, which are opposite, at the pick-up station S10. During the final step, the end of the previous cycle and the beginning of the following cycle thus take place. In other words, the final step of the current cycle takes place simultaneously with the initial step of the following cycle.

The method may comprise a further checking step for checking the angular position of the rotor part 25A or 26A of the actuator 25 or 26 by means of the respective angular encoder 27 or 28 and so as to determine an effective angular position of the shaft 13 (and thus of the gripping head 16 integral therewith) and for modifying the angular position of the shaft 13 in case the effective angular position is below or above a threshold value or interval.

The method may comprise a further acquisition step for acquiring the number n1 and n2 of revolutions by means of the angular encoders 27, 28 which are subsequently processed by a control device so as to determine the translation speed and/or the rotation speed of the shaft 13 and, thus, of the gripping head 16. In particular, the translation speed between the lowered position PA and the raised position PS of the shaft 13 is obtained by multiplying a pitch (i.e., the distance between two successive helical grooves 22 measured along the rotation axis X) of the shaft 13 by the number n1 of revolutions of the inner annular body 23A. The rotation speed of the shaft 13 between the pick-up station S10 and the delivery station S11 is instead determined by multiplying the number n2 of revolutions of the sleeve 24 by 2*n (where 7C is the mathematical constant pi). In order to obtain, instead, the translation speed of the shaft 13, since the sleeves 23 and 24 are operated with the different numbers n1 and n2 of revolutions, it is sufficient to multiply the pitch (as specified above) of the shaft 13 by the difference between the number n2 of revolutions of the inner body 24A and the number n1 of revolutions of the inner annular body 23A (whose number n2 during the pure translation of the shaft 13 is zero). Whereas, in order to obtain the roto-translation speed it is necessary to add together the component of the translation speed (determined as described above) and the component of the rotation speed (determined as described above). In other words, with a linear combination of these two, all the configurations of compound motion of the shaft 13 can be calculated. It is understood that the number n1 or n2 of revolutions is any real number.

In the above disclosure, explicit reference was made, without thereby losing generality, to the feeding unit 12 comprised in a capping machine arranged in the station S4 of the manufacturing machine 6 which feeds caps 3, picked up from a store at the pick-up station S10 and released, in particular on the bottle 1, at the delivery station S11.

In accordance with the present invention, the feeding unit 12 may be instead comprised in a generic manufacturing machine, in particular for the pharmaceutical industry, which feeds closure elements for containers 1, in particular the aforementioned caps 3 or the retaining rings, picked up from a store at the pick-up station S10 and released, in particular on the container 1, at the delivery station S11.

In accordance with the present invention, the feeding unit 12 may be, instead, comprised in a generic assembling machine which feeds an article 3 picked up from a store at the pick-up station S10 and released at the delivery station S11.

The embodiments described herein may be combined with each other without departing from the scope of protection of the present invention.

The feeding unit 12 and the feeding method for feeding the caps 3 or generally any article, described above have numerous advantages.

First of all, the feeding unit 12 is very compact, i.e. it has very reduced spatial dimensions. In fact, since all the components are mounted coaxially, the radial dimensions of the feeding unit 12 are reduced. The feeding unit 12 has a main development in longitudinal direction along the axis X. Therefore, even if the gripping head has two degrees of freedom, the feeding unit 12 is compact.

By arranging the feeding unit 12 on a work surface P approximately at the barycenter of the feeding unit 12, the overturning torques are reduced (in particular they cancel out), thus guaranteeing a high working stability of the feeding unit 12.

The two sleeves 23 and 24, which may be operated independently of each other, allow rotating and/or translating the shaft 13 in a rapid manner and requiring a reduced number of components. In particular, there is no need for motion transmission members which are known to create clearances and thus to reduce the accuracy of the movements of the gripping head 16.

By choosing a torque motor it is not necessary to comprise any reducer which is known to be very bulky. Furthermore, this type of motor allows obtaining a very precise movement of the shaft 13, having a high reaction speed both in terms of lifting and rotation, and having a high peak torque with an excellent degree of efficiency.

In addition, the feeding unit 12 has the advantage of being operated with two electric actuators 25 and 26 in parallel which ensure a rapid variation of acceleration or deceleration independently of each other.

Furthermore, the method described in the foregoing allows moving easily, rapidly and precisely from the pick-up station S10 to the delivery station S11 also small articles or components to be fed or assembled.

Finally, the feeding unit 12 described above is relatively simple and cost-effective to manufacture, since it is composed of structurally simple elements which have few movements that are easy to produce.

The invention claimed is:

1. A feeding unit (12) for a manufacturing machine (6), the feeding unit (12) is configured to feed articles (3) from a pick-up station (S10) to a delivery station (S11) and comprises:
    a gripping head (16), which is provided with at least one gripping means (17), which is configured to pick up and hold an article (3) in the pick-up station (S10) and, subsequently, to release the article (3) in the delivery station (S11);
    a shaft (13), which is mounted on a rotation axis (X) in a rotary manner and is provided with a proximal end (14) and a distal end (15), which is opposite the proximal end (14) and to which the gripping head (16) is attached, wherein the shaft (13) is configured to translate along the rotation axis (X) between a lowered position (PA), in which the articles (3) are picked up and released by the gripping head (16), and a raised position (PS), in which the gripping head (16) rotates between the pick-up station (S10) and the delivery station (S11);
    a first actuator (25), which is coaxial to the shaft (13) and translates the shaft (13) between the lowered position (PA) and the raised position (PS) along the rotation axis (X); and
    a second actuator (26), which is coaxial to the shaft (13) and rotates the shaft (13) around the rotation axis (X) between the pick-up station (S10) and the delivery station (S11).

2. The feeding unit (12) according to claim 1, wherein the first actuator (25) and the second actuator (26) are operable in an independent manner.

3. The feeding unit (12) according to claim 1, wherein:
    the shaft (13) has a plurality of helical grooves (22), which extend between the distal end (15) and the proximal end (14), and wherein the feeding unit (12) comprises a first sleeve (23), which is coaxially arranged on the shaft (13) so as to engage the helical grooves (22) of the shaft (13) and is mounted so as to rotate around the rotation axis (X);

the first actuator (25) causes the rotation of at least a portion of the first sleeve (23) in order to translate the shaft (13) between the lowered position (PA) and the raised position (PS) along the rotation axis (X).

4. The feeding unit (12) according to claim 3, wherein the first sleeve (23) comprises:
a first outer annular body (23B), which is fixed; and
a first inner annular body (23A), which is interposed between the shaft (13) and the first outer annular body (23B), is mounted so as to rotate around the rotation axis (X), is connected to the first actuator (25) and engages the helical grooves (22) of the shaft (13).

5. The feeding unit (12) according to claim 3, wherein:
the first sleeve (23) comprises:
a first outer annular body (23B), which is fixed; and
a first inner annular body (23A), which is interposed between the shaft (13) and the first outer annular body (23B), is mounted so as to rotate around the rotation axis (X), is connected to the first actuator (25) and engages the helical grooves (22) of the shaft (13);
the shaft (13) has a plurality of longitudinal grooves (21), which longitudinally extend between the distal end (15) and the proximal end (14);
a second sleeve (24), which is coaxially arranged on the shaft (13) so as to engage the longitudinal grooves (21) of the shaft (13) and is mounted so as to rotate around the rotation axis (X); the second actuator (26) causes the rotation of at least a portion of the second sleeve (24) in order to rotate the shaft (13) around the rotation axis (X) between the pick-up station (S10) and the delivery station (S11);
the second sleeve (24) comprises:
a second outer annular body (24B), which is fixed; and
a second inner annular body (24A), which is interposed between the shaft (13) and the second outer annular body (24B), is mounted so as to rotate around the rotation axis (X), is connected to the second actuator (26) and engages the longitudinal grooves (21) of the shaft (13); and
the feeding unit comprises a pair of angle encoders (27, 28), each being associated with a corresponding one of the first and second actuator (25, 26) and being configured to acquire the angle position of the corresponding inner annular body (23A, 24A).

6. The feeding unit (12) according to claim 3 wherein:
the shaft (13) has a plurality of longitudinal grooves (21), which longitudinally extend between the distal end (15) and the proximal end (14); the feeding unit (12) comprises a second sleeve (24), which is coaxially arranged on the shaft (13) so as to engage the longitudinal grooves (21) of the shaft (13) and is mounted so as to rotate around the rotation axis (X); the second actuator (26) causes the rotation of at least a portion of the second sleeve (24) in order to rotate the shaft (13) around the rotation axis (X) between the pick-up station (S10) and the delivery station (S11); and
the feeding unit (12) comprises at least one braking device, which is independent of the first and second actuators (25, 26) and is designed to prevent the first sleeve (23) and/or the second sleeve (24) from moving in the absence of supply of power to the actuators (25, 26).

7. The feeding unit (12) according to claim 1, wherein:
the shaft (13) has a plurality of longitudinal grooves (21), which longitudinally extend between the distal end (15) and the proximal end (14);
the feeding unit (12) comprises a second sleeve (24), which is coaxially arranged on the shaft (13) so as to engage the longitudinal grooves (21) of the shaft (13) and is mounted so as to rotate around the rotation axis (X);
the second actuator (26) causes the rotation of at least a portion of the second sleeve (24) in order to rotate the shaft (13) around the rotation axis (X) between the pick-up station (S10) and the delivery station (S11).

8. The feeding unit (12) according to claim 7, wherein the second sleeve (24) comprises:
a second outer annular body (24B), which is fixed; and
a second inner annular body (24A), which is interposed between the shaft (13) and the second outer annular body (24B), is mounted so as to rotate around the rotation axis (X), is connected to the second actuator (26) and engages the longitudinal grooves (21) of the shaft (13).

9. The feeding unit (12) according to claim 1, wherein each actuator (25, 26) comprises a synchronous electric motor.

10. The feeding unit (12) according to claim 1 and comprising at least two gripping means (17), which are arranged on different sides of the gripping head (16) so that, when a gripping means (17) is in the pick-up station (S10), the other gripping means (17) is in the delivery station (S11) and vice versa.

11. The feeding unit (12) according to claim 1 and comprising a control device, which is configured to control the two actuators (25, 26) so as to cyclically rotate the gripping head (16), at first, in a direction and, subsequently, in the opposite direction, so as to cause the gripping head (16) to make an oscillatory movement around the rotation axis (X) having a rotation angle (α) of 180°.

12. The feeding unit (12) according to claim 1 and comprising a control device, which, by controlling the first and second actuators (25, 26), is configured to:
operate the first actuator (25) to cause only a first sleeve (23) to rotate and keeping a second sleeve (24) still, so as to obtain only a translation of the gripping head (16); and
operate the first and second actuators (25, 26) to cause the first sleeve (23) and, simultaneously, the second sleeve (24) to rotate, so as to obtain only a rotation of the gripping head (16).

13. The feeding unit (12) according to claim 1, wherein the shaft (13) is hollow in order to house, on the inside, components.

14. A manufacturing machine, comprising a pick-up station (S10), a delivery station (S11), and the feeding unit (12) according to claim 1, wherein the feeding unit (12) is configured to feed closing elements for containers (1), which are picked up from a store in the area of the pick-up station (S10) and are released onto the container (1), in the area of the delivery station (S11).

15. An assembling machine comprising a pick-up station (S10), a delivery station (S11), and the feeding unit (12) according to claim 1, wherein the feeding unit (12) is configured to feed an article (3), which is picked up from a store in the area of the pick-up station (S10) and is released in the area of the delivery station (S11).

16. A method to feed articles (3), with the feeding unit (12) according to claim 1, from a pick-up station (S10) to a delivery station (S11); the method comprises a cycle, which is defined by:

an initial step, during which the articles (3) are picked up, in an area of the pick-up station (S10), by a first gripping means (17) of the gripping head (16);

an intermediate step to operate the first actuator (25) in order to move the shaft (13) along the rotation axis (X) between the lowered position (PA) and the raised position (PS) and/or to operate both the first actuator (25) and the second actuator (26) in order to rotate the shaft (13) around the rotation axis (X) between the pick-up station (S10) and the delivery station (S11); and a final step, during which the articles (3) are released from the gripping head (16), in the area of the delivery station (S11), by the first gripping means (17).

17. The method according to claim 16, wherein the first step, the intermediate step, and the final step are a cycle, the method further comprising repeating the cycle, wherein the final step of a previous cycle takes place simultaneously with the initial step of a following cycle.

18. The method according to claim 16, wherein the intermediate step takes place with a cyclic rotation from 0 to 180° of the shaft (13), reversing a direction of rotation between two successive cycles.

\* \* \* \* \*